US009426037B2

(12) United States Patent
Butler et al.

(10) Patent No.: US 9,426,037 B2
(45) Date of Patent: Aug. 23, 2016

(54) METHOD AND APPARATUS FOR AUTOMATING NETWORK DATA ANALYSIS OF USER'S ACTIVITIES

(71) Applicant: PathAR, Inc., Colorado Springs, CO (US)

(72) Inventors: Patrick David Butler, Highlands Ranch, CO (US); Tony Brett Marshall, Leawood, KS (US); Mark F. Jacobson, Lone Tree, CO (US)

(73) Assignee: PathAR, Inc., Colorado Springs, CO (US)

( * ) Notice: Subject to any disclaimer, the term of this patent is extended or adjusted under 35 U.S.C. 154(b) by 233 days.

(21) Appl. No.: 13/931,467

(22) Filed: Jun. 28, 2013

(65) Prior Publication Data

US 2015/0007037 A1  Jan. 1, 2015

(51) Int. Cl.
    G06F 3/048  (2013.01)
    H04L 12/24  (2006.01)

(52) U.S. Cl.
    CPC .............. *H04L 41/22* (2013.01); *H04L 41/12* (2013.01)

(58) Field of Classification Search
    CPC .............. G06F 17/30864; G06F 12/08; G06F 17/30707
    See application file for complete search history.

(56) References Cited

U.S. PATENT DOCUMENTS

| | | | | |
|---|---|---|---|---|
| 2005/0177446 A1* | 8/2005 | Hoblit | .................... | G06Q 10/10 705/26.1 |
| 2006/0155746 A1* | 7/2006 | Abrams | ............ | G06F 17/30961 |
| 2007/0094247 A1* | 4/2007 | Chowdhury | ...... | G06F 17/30864 |
| 2008/0070209 A1* | 3/2008 | Zhuang | .................. | G06Q 30/02 434/236 |
| 2010/0023387 A1* | 1/2010 | Pan | ........................ | G06Q 30/02 705/14.4 |
| 2010/0268661 A1 | 10/2010 | Levy et al. | | |
| 2011/0131209 A1* | 6/2011 | Bechtel | .................. | G06N 5/025 707/737 |
| 2011/0263298 A1* | 10/2011 | Park | ....................... | G06F 3/0488 455/566 |
| 2011/0264663 A1 | 10/2011 | Verkasalo | | |
| 2012/0173985 A1 | 7/2012 | Peppel | | |
| 2013/0031216 A1 | 1/2013 | Willis et al. | | |
| 2013/0041860 A1* | 2/2013 | Lawrence | .............. | G06Q 50/01 706/46 |
| 2013/0125020 A1* | 5/2013 | Lee | ........................ | G06Q 10/10 715/752 |
| 2014/0344288 A1* | 11/2014 | Evans | ............... | G06F 17/30867 707/749 |

OTHER PUBLICATIONS

International Search Report and Written Opinion, Application No. PCT/US2014/044849, Oct. 28, 2014 (12 pages).
International Search Report on Patentability mailed on Jan. 7, 2016 for International Patent Application No. PCT/US2014/044849, all pages.

* cited by examiner

*Primary Examiner* — William Bashore
*Assistant Examiner* — Rayeez Chowdhury
(74) *Attorney, Agent, or Firm* — Kilpatarick Townsend & Stockton LLP (57) ABSTRACT

In some embodiments, a non-transitory processor-readable medium stores code representing instructions for execution by a computer processor. The instructions cause the processor to produce a list of subjects by identifying a plurality of subjects based on information associated with an analyst-selected topic. The list of subjects is expanded to include subjects that have a relationship with at least one subject from the first list of subjects. Subjects are removed from the list based on either a filter or a scoring threshold. The expanding and removing subjects is iterated until the list of subjects is substantially stable to produce a final list of subjects. A graphical network is defined based on the final list of subjects and a signal is sent representing the graphical network (e.g., to a computer monitor for display).

14 Claims, 6 Drawing Sheets

METHOD AND APPARATUS FOR AUTOMATING NETWORK DATA ANALYSIS OF USER'S ACTIVITIES

BACKGROUND

Some embodiments relate to automating network data analysis of user's activities. In particular, but not by way of limitation, some embodiments relate to systems and methods for generating graphical networks. Also not by way of limitation, other embodiments relate to systems and methods for automatically monitoring network data activity.

Analytical professionals have, for many years, manually built network graphs to identify, define, and visualize relationships among the information under study. These graphs can take hours or days to build manually, and the graphs quickly become obsolete. Introduction of new data and the passage of time can significantly alter the analysis. The analyst can then take many more hours or days to complete the process again and/or update the analysis, only to have the newly generated graph become obsolete again. While solutions have been developed for portions of this larger process (e.g., visualization of the network graph), no comprehensive solution exists for quickly and accurately executing the complete analytic process (e.g., get starting point data, run models, iterate logically, display results). Instead, the partial solutions that exist involve the user specifying each step of the process—meaning, the user slowly builds such graphs one step at a time.

Although known systems are functional, they are not sufficiently accurate or otherwise satisfactory. Accordingly, a system and method are needed to address the shortfalls of known systems and to provide other new and innovative features.

SUMMARY

In some embodiments, a non-transitory processor-readable medium stores code representing instructions for execution by a computer processor. The instructions cause the processor to produce a list of subjects by identifying a plurality of subjects based on information associated with an analyst-selected topic. The list of subjects is expanded to include subjects that have a relationship with at least one subject from the first list of subjects. Subjects are removed from the list based on either a filter or a scoring threshold. The expanding and removing of subjects is iterated until the list of subjects is substantially stable to produce a final list of subjects. A graphical network is defined based on the final list of subjects and a signal is sent representing the graphical network (e.g., to a computer monitor for display).

The above-described embodiments and implementations are for illustration purposes only. Numerous other embodiments, implementations, and details are possible based on the following descriptions and claims.

DETAILED DESCRIPTION

In some embodiments, a non-transitory processor-readable medium stores code representing instructions for execution by a computer processor (e.g., a software program). The instructions cause the processor to identify subjects based on information associated with an analyst-selected topic to produce a first list of subjects. The first list of subjects is then expanded to include subjects that have a relationship with at least one subject from the first list of subjects to produce a second list of subjects. A third list of subjects is produced from the second list of subjects by removing subjects based on either a filter or a scoring threshold. The instructions cause the processor to replace the first list of subjects with the third list of subjects and iterate expanding and removing subjects from the list of subjects until the list of subjects is substantially stable to produce a final list of subjects. The instructions cause the processor to define a graphical network based on the final list of subjects and send a signal representing the graphical network (e.g., to a computer monitor for display).

Another illustrative embodiment is a method for monitoring changes to a graphical network. The method includes selecting subjects based on information associated with a topic to produce a list of subjects. The method also includes defining a graphical network based on the list of subjects, and sending a signal representing the graphical network (e.g., to a computer monitor for display). The selecting, defining, and sending steps can be repeated such that multiple graphical networks are produced. Generating multiple graphical networks can allow an analyst to analyze the graphical networks to identify patterns and/or changes over time.

Another illustrative embodiment is a method for producing a graphical network. The method includes identifying multiple subjects based on social media activities associated with a topic to produce a first list of subjects, each subject from the multiple subjects having an influence score above a threshold. The method also includes removing subjects from the first list of subjects based on predefined criteria (e.g., a filter). The method further includes identifying subjects to produce a second list of subjects, each subject from the second list of subjects having a relationship with at least one subject from the first list of subjects. The method also includes adding the first list of subjects to the second list of subjects to generate a third list of subjects, and removing subjects from the third list of subjects that have a subject influence score below a threshold or based on other predefined criteria. The method further includes replacing the first list of subjects with the third list of subjects and repeating (1) the identifying subjects to produce a second list of subjects, (2) the adding the second list of subjects to the first list of subjects to produce a third list of subjects, and (3) the removing subjects from the third list of subjects having an influence score below a threshold or based on other predefined criteria until the third list of subjects is substantially stable, to produce a final list of subjects. Once a final list of subjects is produced, the method includes defining a graphical network based on the final list of subjects, and sending a signal representing the graphical network.

As used herein, the singular forms "a," "an" and "the" include plural referents unless the context clearly dictates otherwise. Thus, for example, the term "a database" is intended to mean a single database or multiple databases.

As used herein, a module can be, for example, any assembly and/or set of operatively-coupled electrical components associated with performing a specific function, and can include, for example, a memory, a processor, electrical traces, optical connectors, software (stored in memory and/or executing in hardware) and/or the like.

Figure 1:
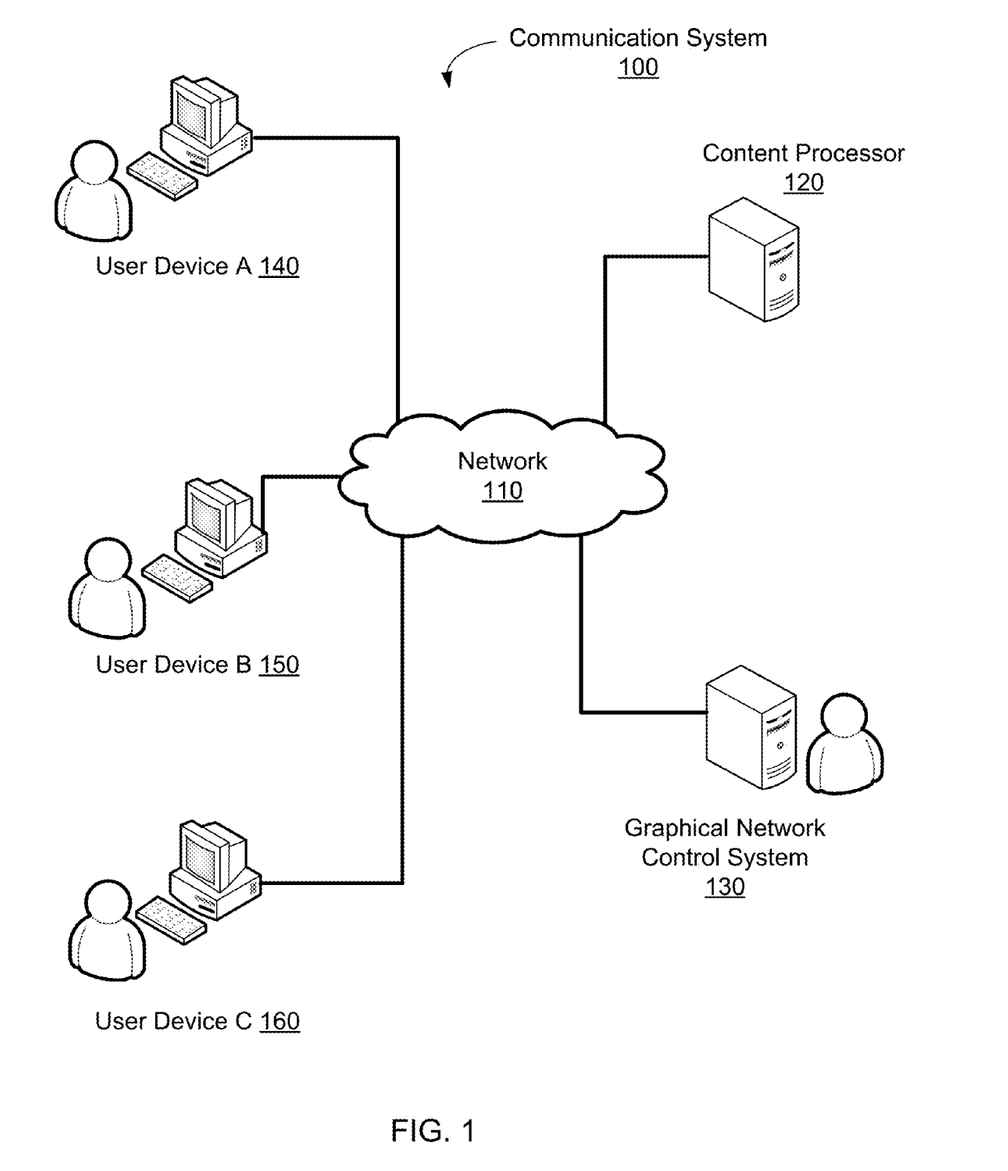
FIG. 1 illustrates a diagram of a networked system implementing a graphical network control system, according to an illustrative embodiment.

FIG. 1 illustrates a diagram of a communication system 100 including a network 110, multiple user devices 140, 150, 160, a graphical network control system 130, and a content processor 120, according to an embodiment.

Network 110 can be any type of network (e.g., a local area network (LAN), a wide area network (WAN), a virtual network, a cloud network, a telecommunications network) implemented as a wired network and/or wireless network. Network 110 can represent the internet, a global network for communication between all types of computers, servers, and other devices capable of communicating over the internet. User device A 140, user device B 150, user device C 160, content processor 120, and graphical network control system 130 can communicate through network 110. Though only three user devices are depicted in FIG. 1, network 110 can facilitate communication between any number of user devices. Similarly, multiple content processors 120 can be connected to network 110 though only one content processor 120 is shown in FIG. 1.

Content processor 120 can be any type of computer or device that provides content or services that user devices connect to and that can collect and/or store information. For example, content processor 120 can be a social network server that allows users to communicate with each other through a server provided interface (e.g., Facebook®, Twitter®, LinkedIn®, and so forth). In some embodiments, content processor 120 can be a gaming server, an email server, a merchant server for offering products for sale, an information resource server, and/or any other appropriate server or computer. Content processor 120 can allow user devices 140, 150, 160 to connect and provide information. The information provided by user devices 140, 150, 160 can include personally identifiable information of the user, purchase information, communications and/or messages from the user to one or more other users, web log (blog) posts, forum posts, email messages, social media activity, and/or any other information that can be provided by a user device to a content processor. Content processor 120 can collect and/or store any or all of the information provided by user devices 140, 150, 160. Content processor 120 can be connected to network 110 via any appropriate communication interface (e.g., a network card, a router, a switch), and/or content processor 120 can be connected to a local network (e.g., a LAN, a virtual network), which can be connected to network 110. While only one content processor 120 is depicted in FIG. 1, any number of content processors 120 can be connected to network 110 and collect and/or store information provided by user devices 140, 150, 160.

Graphical network control system 130 can be a computer system capable of producing a graphical network. Graphical network control system 130 can be on, for example, any appropriate computer or server. Graphical network control system 130 can communicate via network 110 with content processor 120 as well as any other computer or device connected to network 110. Graphical network control system 130 can communicate with any appropriate computer, server, and/or memory directly connected to graphical network control system 130 without being connected via network 110. Graphical network control system 130 can be connected to network 110 via any appropriate communication interface (e.g., a network card, a router, a switch), and/or graphical network control system 130 can be connected to a local network (e.g. a LAN, a virtual network, or any other suitable local network), which can be connected to network 110. Graphical network control system 130 is described in more detail in FIG. 2.

Figure 2:
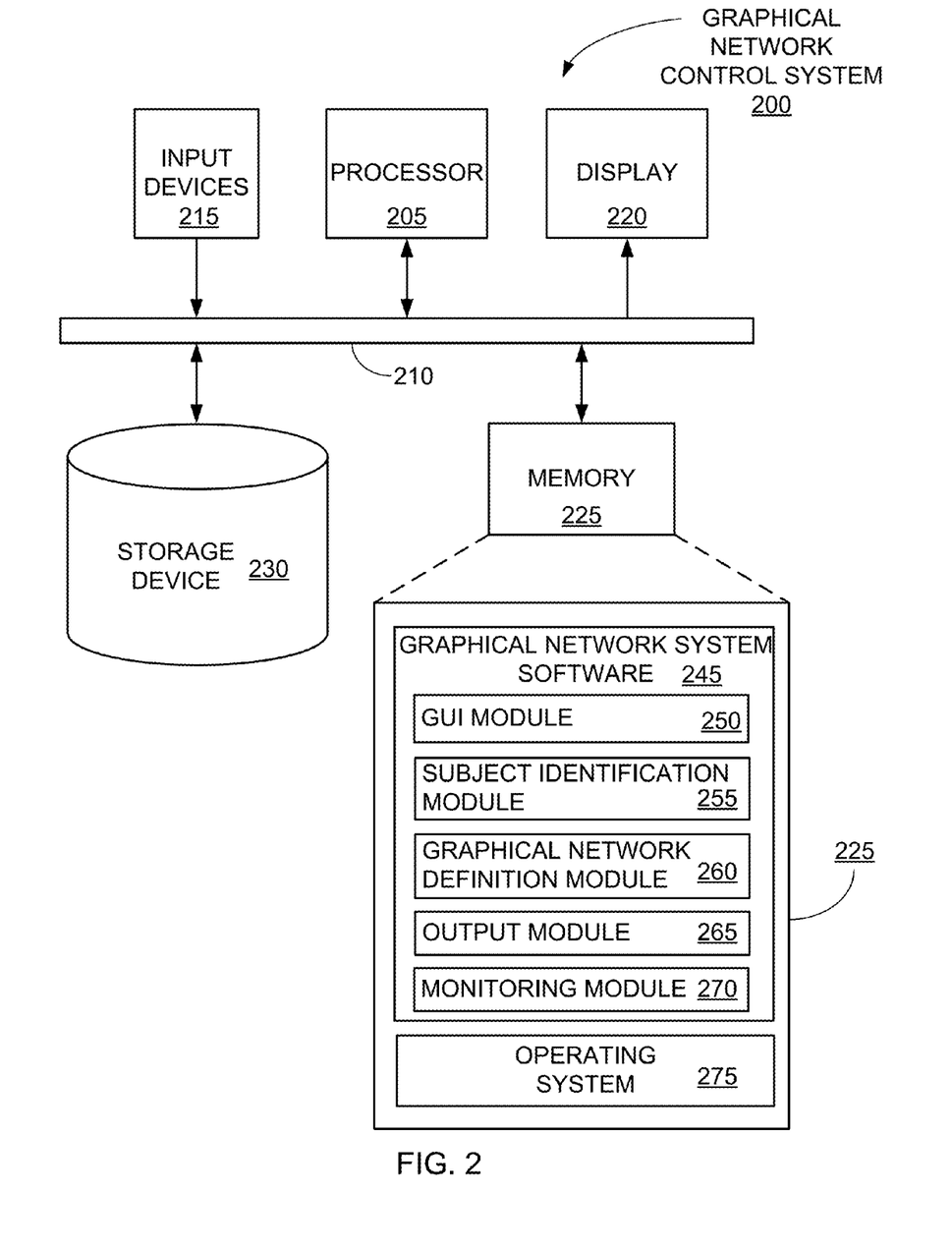
FIG. 2 illustrates a functional block diagram of a graphical network control system, according to an illustrative embodiment.

User device A 140, user device B 150, and user device C 160 represent individual user devices that communicate via network 110. A user device 140, 150, 160 can be a computer, server, smartphone, tablet, hand-held device, and/or any other user device capable of communicating over network 110 with content processor 120. Each user device 140, 150, 160 can have one or more users that access programs and information on the user device. User devices 140, 150, 160 use the network 110 to communicate with other devices coupled to the network 110, including, for example, the other user devices, servers, content processors (e.g. content processor 120), and/or any other suitable device capable of communication. User devices 140, 150, 160 can communicate with content processor 120 to perform any number of activities including, for example, email, social networking, gaming, shopping, information retrieval, and so forth. While only three user devices are depicted in FIG. 2, any number of user devices can connect to network 110; such user devices can allow users to provide information to and/or receive information from content processor 120. Any user that provides data used in a data source for an analysis by graphical network control system 130 can be a subject in the analysis, as described in more detail below.

In use, user device A 140, user device B 150, and/or user device C 160 can provide user information to content processor 120. As described above, the user information can be, for example, email messages, purchase information, login information, social networking posts, forum posts, forum replies, Tweets®, re-Tweets®, profile information, demographic information, and/or any other information that can be communicated by a user to a computer system. An analyst can use graphical network control system 130 to analyze the user information. Graphical network control system 130 can retrieve the user information (e.g., information about and/or from users including users that provide user information on user devices 140, 150, 160.) from content processor 120 via network 110. Graphical network control system 130 can analyze the user information, as described in further detail in the description of the remaining figures, and produce a graphical network for the analyst's use.

FIG. 2 illustrates a functional block diagram of a graphical network control system, according to an embodiment. Graphical network control system 200 can be similar to graphical network control system 130 shown in FIG. 1. Graphical network control system 200 can include a data bus 210 for communication between processor 205, input devices 215, display 220, memory 225, and storage device 230. While FIG. 2 depicts only a single processor 205, multiple processors, a multi-core processor, or multiple multi-core processors may be present in some embodiments. The processor 205 can be a general purpose processor, a Field Programmable Gate Array ("FPGA"), an Application Specific Integrated Circuit "ASIC"), a Digital Signal Processor ("DSP"), and/or the like. The processor 205 can be configured to run and/or execute application authorization processes and/or other modules, processes and/or functions associated with graphical network control system 130.

Additionally, the components of graphical network control system 200 can be on a networked system such that multiple computer systems are used. For example, storage device 230 can be a redundant array of independent disks ("RAID") array or another database computer system separate from the computer that contains graphical network system software 245. In some embodiments including a network, the network can be any type of network (e.g., a local area network (LAN), a wide area network (WAN), a virtual network, a cloud network, a telecommunications network) implemented as a wired network and/or wireless network.

Input devices 215 can be, for example, a keyboard, a mouse, a scanner, and/or any other suitable input device. Input devices 215 can be hard-wired or wireless. Input devices 215 can include multiple input devices (e.g., a keyboard and a mouse).

Display 220 can be any suitable computer monitor for displaying static or dynamic images. In some embodiments, display 220 can be a touch screen. In some embodiments, display 220 can include multiple computer monitors.

Memory 225 can be, for example, a random access memory ("RAM"), a read-only memory ("ROM"), a memory buffer, a flash memory, a hard drive, a database, an erasable programmable read-only memory ("EPROM"), an electrically erasable read-only memory ("EEPROM"), and/or so forth. While FIG. 1 depicts a single memory, in some embodiments multiple memory devices including combinations of different types of memory can be used. The memory 225 can store instructions to cause the processor to execute modules, processes, and/or functions associated with graphical network control system 200. As shown in FIG. 2, memory 225 can include an operating system 275 and graphical network system software 245.

Operating system 275 can include any suitable operating system for use on graphical network control system 200. Some examples of common computer operating systems include Windows® and Linux®. In some instances, the operating system 275 for graphical network control system 200 can be a server operating system such as Windows Server® 2012. In other instances, the operating system 275 for graphical network control system 200 can be a personal computer operating system such as Windows® 8.

Graphical network system software 245 can include executable program instructions organized as functional modules, including GUI module 250, subject identification module 255, graphical network definition module 260, output module 265, and monitoring module 270. While the functional modules listed can be used, the graphical network system software 245 can include more or fewer modules with the associated functionalities organized in different ways or across different modules.

GUI module 250 can be used to produce a graphical user interface for the analyst to interact with the graphical network system software 245. For example, the analyst can select a topic (i.e., an analyst-selected topic) on which to base the graphical network. A topic can include an event (e.g., the Occupy Wall Street protest that began in 2011, the most recent Aerosmith concert, or any other event of interest). A topic can also include a person or entity (e.g., Osama bin Laden, Ke$ha, NASA, Denver Broncos, or any other person or entity of interest). In some embodiments, a topic can include multiple items. For example, a topic can include a person and an event, a person and a location, any number of keywords, and/or any combination thereof. A topic can further be limited by a spoken language (e.g., French, Spanish, etc.). For example, the topic can include a location and keywords that are communicated in a specific spoken language.

In some embodiments the graphical user interface can include multiple display screens for selecting a source for the data analysis (e.g., an email message database, a Twitter® database, an existing analysis, a Facebook® database, and so forth) as well as the topic. For example, a first display screen can allow the analyst to select a source for the data analysis, a second display screen can allow the analyst to select keywords, a third display screen can allow the analyst to select a location, and so forth, until the analyst has sufficiently identified the topic. In some embodiments, multiple selections can be displayed on a single display screen. For example, the analyst may be able to select the keywords, location, and language all from a single display screen. In some embodiments, the data source can be identified by the graphical network system software 245 or default to a default data source if not selected by the analyst.

Subject identification module 255 can identify subjects from the data source. In some embodiments, subject identification module 255 can select subjects based on information associated with the analyst-selected topic in the data source. For example, subject identification module 255 can return an initial list of subjects based on a search of the data source for subjects identified using the analyst-selected topic. Subject identification module 255 can then select subjects from the initial list for further processing. As a more specific example, subject identification module 255 can select subjects from a Twitter® database of Tweets® based on an analyst-selected topic that includes keywords and a location. Once the initial list of subjects is identified, subject identification module 255 can, for example, select the most prominent subjects based on, for example, the number of Tweets® each subject contributed. The number of subjects selected can be based on a default number, a threshold value, or any other suitable basis. For example, in some embodiments, the analyst can select an initial number of subjects to select based on the analyst-selected topic. In some embodiments, a default number (e.g., 10, 20, 50) of subjects can be selected. In some embodiments, subject identification module 255 can select all subjects that exceed a predetermined threshold value. For example, once an initial list of subjects is identified from a Twitter® database, subject identification module 255 can score the subjects based on number of Tweets® and select any subjects that exceed a predetermined threshold of Tweets® (e.g., 25, 50, 100). The scoring and threshold values can also be values other than volumetric data. For example, subject identification module 255 can select an initial list of subjects from the Twitter database based on keywords and location. Once the initial list of subjects is identified, subject identification module 255 can score the subjects based on their proximity to the location identified by the analyst. Subject identification module 255 can, for example, select the top 100 subjects based on their proximity to the analyst-selected location, or, for another example, select the subjects that are within 150 miles of the analyst-selected location. As another example, once the initial list of subjects is identified, subject identification module 255 can score the subjects based on their relevance to the analyst-selected topic. Subject identification module 255 can set a threshold value for the scoring and identify the subjects that fall within the threshold range of relevance to the analyst-selected topic for further processing.

Any type of data source can be used. The information in the data source can be used to identify subjects based on information associated with the subject in the data source. The information can include, for example, emails sent by or to the subject, phone numbers called by the subject, demographic information of the subject (e.g., age, address, political affiliation, likes and dislikes, and so forth), comments posted on a website, comments posted in a social media forum, comments or reviews posted on a retail website, replies to comments posted on a social media forum, reposting another user's comment (including social media comments), other social media activities, and/or any other contributions made to a data source that can be used for analysis of subjects.

The data source can be any source of data available to the graphical network control system 200. For example, it can be a content processor on the network that contains data that is accessible by graphical network control system 130 (e.g., content processor 120 (FIG. 1)). The data source can include any type of data capable of being used for analysis (e.g., email messages, Tweets®, Facebook® posts, web log posts, and so forth). In some embodiments, data can be loaded into a database for use with graphical network control system 200. For example, graphical network control system 200 can connect to one or more content providers (e.g., servers, content processors), collect data from the content provider, and store the data in storage device 230. The graphical network control system 200 can then use the storage device 230 as the data source. In some embodiments, the data source can be preloaded before running graphical network control system 200. In other embodiments, the data source can be loaded with data during processing. For example, the data source can be loaded by the subject identification module 255 prior to identifying subjects based on the analyst-selected topic.

Once the initial list of subjects is identified, the subject identification module 255 can score the list of subjects. Any network data scoring method can be used, including, for example, Closeness Centrality, Betweenness Centrality, and/or any other suitable network scoring algorithm—typically referred to as Social Network Analysis ("SNA") algorithms. In some embodiments, subject identification module 255 can remove subjects based on a filter or other predefined criteria. A filter can include, for example, removing subjects based on a list of known subjects that skew results (e.g., famous individuals/celebrities with millions of followers, and so forth). Predefined criteria that can be used for removal of subjects from the subject list can include, for example, a subject importance score from the network data scoring that falls below a predefined threshold.

Subject identification module 255 can continue to identify subjects relevant to the analysis based on the initial list of subjects. A relationship can be, for example, a relationship based on user activity. For example, subject identification module 255 can expand the list of subjects based on a relationship with one or more subjects in the current list of subjects. Similarly stated, the subject identification module 255 can add subjects to the list of subjects based on a relationship with one or more existing subjects in the list. For example, if the data source is a database containing Facebook® posts, a relationship can exist between "Pam" and "Michael" if "Michael" comments on a post made originally by "Pam." Relationships in social media can include self-identified relationships. Self-identified relationships include relationships that are explicitly defined by the user. For example, a self-identified relationship exists between "Jim" and "Dwight" if the two subjects are Facebook® "friends." Contrastingly, the relationship between "Pam" and "Michael" that was identified by "Michael's comments on a post made originally by "Pam" can be an assertion. Assertions are relationships defined or identified by subject behavior in a networking environment. Another example of a relationship based on an assertion can be a "re-tweet" of another individual's Tweet®. Similarly, email messages sent from one user, "Andy," to another user, "Erin" define a relationship between "Erin" and "Andy" based on an assertion. Other activities that can define or identify a relationship can include a reply to a post by a subject, a social media contribution (including replies to social media contributions) on or related to social media contributions by the subject, and/or any other activity suitable for identifying a relationship between two subjects. Some social media providers provide a way for users to connect. The relationships defined by social media providers allow a user to self-identify with another user. Examples of social media defined relationships include Facebook® "friends," LinkedIn® "connections," Twitter® "followers," and so forth.

Other examples of assertions, whether the information is gathered in a social media context or not, that can be used to select subjects based on a prior list of subjects include the two subjects performing the same actions, being at the same location, having the same associations, having the same characteristics, and so forth. An example of two subjects performing the same action can be both subjects calling the same telephone number. Depending on the number called, the number of times each subject called the number, the duration of each call, and so forth, an assertion can be made as to whether a relationship exists between the two subjects and the strength of the assertion. An example of two subjects being at the same location can include being at the same location on the same day or at the same time. Depending on the location, the date and time of the visit, whether or not the visits overlapped in time, and so forth, an assertion can be made as to whether a relationship exists between the two subjects and the strength of the assertion. Examples of two subjects having the same associations can be that both subjects are Libertarians, own a small business, are members of the NRA, and so forth. Depending on the type of association, the size of the group, the number of overlapping associations, and so forth, an assertion can be made as to whether a relationship exists between the two subjects and the strength of the assertion. Examples of two subjects having the same characteristics can be that both subjects like pizza, own cats, drive a car made by Ford Motor Company®, and so forth. Depending on the type of characteristics, the number of overlapping characteristics, and so forth, an assertion can be made as to whether a relationship exists between the two subjects and the strength of the assertion. Additionally, multiple assertions can be made to strengthen the assertion overall. For example, if an assertion as to the location of the subjects and an assertion as to the associations of the subjects can both be made, the assertion of a relationship between the two subjects can be stronger. Additionally, while the assertions were described above with respect to two subjects, assertions between more than two subjects can be made based on the same information.

Subject identification module 255 can score the updated subject list and again remove subjects based on a filter and/or other predefined criteria. A filter can be used to filter out specific subjects or types of subjects. For example, celebrities are often very popular and generate a great deal of user activity, but celebrities are often not relevant to the analysis and/or the celebrity can skew the results. A filter can be used to automatically remove known celebrities from the subject list. Predefined criteria can be any criteria an analyst uses to remove subjects from the subject list. For example, in some cases, a subject can achieve celebrity status on a topic, but not be a recognized celebrity for inclusion on a filter list. Predefined criteria can be used to remove subjects that skew the graphical network by defining a relationship volume threshold, for example. Subject identification module 255 can remove subjects that have a volume of relationship data above the relationship volume threshold. Other predefined criteria can include, for example, a subject importance scoring threshold. Subject identification module 255 can remove subjects with a subject importance score that falls below the subject importance scoring threshold. Other predefined criteria examples include contributions that appear on a specific website, too few contributions, and/or any other suitable criteria an analyst can use to remove subjects from the subject list.

Subject identification module 255 can continue to iterate expanding the subject list based on relationships of other potential subjects with the subjects in the subject list and removing subjects based on one or more filters and/or other predefined criteria. Iterating can result in a subject list that becomes more and more stable. Subject identification module 255 can stop reiterating the expansion of the subject list and removal of subjects from the list when the subject list becomes substantially stable. In some embodiments, the subject list can become completely stable. Similarly stated, the subject list can remain the same after enough iterations are run such that the expansion and removal of subjects from the subject list can result in the same subjects on the list. Stated yet another way, a completely stable subject list is one that results in the same list of subjects after each iteration of the subject identification module 255 reiterating the expansion and removal of subjects from the subject list. Complete stability, however, can be impossible in some cases and is not necessary in many cases. In some embodiments, therefore, substantial stability can end the reiteration of the expansion and removal of subjects from the subject list. Substantial stability can be, for example, when the subject list changes by less than a certain number of subjects after an iteration (e.g., ten subjects change after an iteration and the threshold is 12). Another example of substantial stability can be when the subject list changes by less than a certain percentage of subjects after an iteration. Similarly stated, after an iteration that results in a change in the subject list that falls below a predetermined percentage change of subjects (e.g., 5%, 10% or 25%), the subject list can be considered substantially stable, and the subject identification module 255 can cease reiterating the expansion and removal steps.

In some embodiments, subject identification module can be configured to limit the list of identified subjects to a predetermined number. For example, the analyst can limit the number of subjects to the top two hundred most important subjects. In some embodiments, the limit can be set as a default setting. Similarly stated, the graphical network control system 200 can be configured to always identify the top, for example, fifty most important subjects.

Graphical network definition module 260 can define the graphical network based on the list of subjects identified by subject identification module 255. For example, graphical network definition module 260 can define the importance of each subject and identify all connections that exist between the subjects. In some embodiments, the importance of each subject can be defined by a subject importance score. The subject importance score can be determined by factors including the number of other subjects associated with the subject, the number of communications associated with the subject, and/or any other factor that is relevant in determining the importance of a subject. In some embodiments, the connections between the subjects can be defined to indicate the strength of the connection. For example, a self-identified connection (i.e., a connection between two subjects that was created by the subjects, for example, the two subjects are Facebook® "friends") can be stronger than a single comment from the first subject in response to a comment from the second subject on a web forum website. The strength of the connection can be defined by a subject-to-subject connection score.

Output module 265 can output the defined graphical network for use by the analyst. Graphical network definition module 260 can define the graphical network, and output module 265 can use that definition to generate a graphical depiction for use by the analyst. For example, the subject importance scores can be shown by, for example, the size or the color of the subject node in the graphical depiction. Similarly, the connections defined by the graphical network definition module 260 can be depicted to the analyst. Similarly stated, output module 265 can produce a graphical depiction of the defined graphical network that allows the analyst to easily recognize the significance of any of the subjects depicted in the graphical network.

In some embodiments, output module 265 can show the subject-to-subject connection score by, for example, the thickness or length of the line connecting the two subjects in the graphical network. Similarly stated, two subjects with a weak connection can have a connection line that is thin compared to the thickness of a connection line between two subjects with a strong connection. As another example, two subjects with a strong connection can be depicted in the graphical network as having a short connection line (i.e., close together) compared to two subjects with a weak connection.

In some embodiments, output module 265 can be used to display the graphical network and allow the analyst to modify the analysis. For example, output module 265 can provide a graphical user interface that can include options for allowing the analyst to remove specific subjects from the initial analysis and re-run the analysis—including multiple iterative applications of the algorithms/filters—using the modified subject list. Similarly, after a graphical network is produced, the analyst can be allowed to modify any of the topic criteria to tune the resulting graphical network. In some cases, an analyst can tune the graphical network by specifying subjects to include that did not appear in the graphical network. Any tuning criteria can be used that can produce an optimal graphical network.

In some embodiments, tuning the resulting graphical network can be done by a call to GUI module 250. In some embodiments, output module 265 can provide a tuning user interface. For example, the analyst can be allowed to tune the graphical network by selecting, on the displayed graphical network, subject nodes to delete or add. Other topic criteria can be modified from the graphical network display screen, in some embodiments.

Tuning the graphical network can be used for any number of reasons (e.g., the graphical network is too large or too small, a subject node is skewing the results, additional topic criteria is needed, less topic criteria is desired, and/or any other suitable reason). Tuning a graphical network can produce an updated graphical network more quickly than starting the entire analysis from the beginning. Tuning results can be nearly immediate. An example of a specific subject in a graphical network skewing the output can be because the subject is famous. To tune the graphical network, the analyst can choose to remove the famous subject and run the graphical network system software 245 without that subject. The analyst can remove the subject and make any other desired changes using a user interface. Once the analyst has completed the tuning changes, output module 265 can generate an updated graphical network, incorporating the changes the analyst requested.

In some embodiments, each change made by the analyst can cause the output module 265 to automatically re-run the entire analysis based on the analyst-selected topic with the specified tuning change. In other embodiments, each change made by the analyst can cause the output module 265 to modify the analysis based on the change, for example, by starting with the subjects identified in the graphical network (including any additions or removals by the analyst) and using subject identification module 255 to score the network and add and remove subject nodes until the graphical network is substantially stable as described above.

In other embodiments, the analyst can tune the graphical network by making multiple changes. Once the analyst is satisfied with the selected changes, the analyst can notify the output module 265 to re-run the analysis using, for example, a button on the user interface that the analyst can click. The output module 265 can then re-run the entire analysis as described above or the output module 265 can modify the graphical network based on the change by, for example, starting with the subjects identified in the graphical network as described above.

Output module 265 can also be used to send alerts if a substantial change to the graphical network occurs while the graphical network control system 200 is monitoring a specific graphical network. Similarly stated, if the graphical network control system 200 is monitoring a graphical network and a new graphical network is rendered that has significant changes (e.g., changes over a threshold percentage or number of nodes), the output module 265 can send an alert to the analyst via, for example, text message, email message, an alert on the display 220, and/or any other suitable alert mechanism.

Monitoring module 270 can be used to monitor a graphical network for changes based on changes in information associated with the analyst-selected topic. An analyst can choose to monitor a graphical network to determine, for example, if changes to the graphical network occur or significant activity related to the topic on which the graphical network is based. In some embodiments, the monitoring module 270 can call the subject identification module 255 and graphical network definition module 260 to re-generate the entire graphical network.

The monitoring module 270 can be configured to generate an updated graphical network periodically (e.g., every 15 minutes, every 2 hours, or any other suitable period of time). Alternatively, or in addition to, periodically, the monitoring module 270 can be configured to monitor the analyst-selected topic and generate an updated graphical network if a threshold of new activity on the analyst-selected topic is met. Similarly stated, monitoring module 270 can monitor user activity at the data source. If a sufficient amount of new activity is detected that meets the requirements of the analyst-selected topic (e.g., location, person/entity of interest, and/or so forth), monitoring module 270 can call subject identification module 255 and graphical network definition module 260, to produce an updated graphical network. In some embodiments, monitoring module 270 can receive notification from the data source that an update to the information associated with the analyst-selected topic has occurred, thereby triggering the monitoring module 270 to generate a fresh graphical network based on the new information.

In some embodiments, monitoring module 270 can call output module 265 to render an image of the graphical network for display to the analyst on display 220, to email to the analyst, and/or to provide in any other suitable output format. In some embodiments, the updated graphical network can be generated based on the entire dataset of information. Similarly stated, the updated graphical network is not generated based on the old graphical network and the new information. Instead, the updated graphical network can be generated as if it were the first graphical network generated on that analyst-selected topic.

In other embodiments, monitoring module 270 can generate an updated graphical network based on the previously generated graphical network and incorporating the additional information since the last graphical network was generated. For example, the monitoring module 270 can call the subject identification module 255 to expand the previously generated graphical network and include the updated information that meets the analyst-selected topic criteria.

In some embodiments, output module 270 can analyze the differences between the most recently produced graphical network and the second most recently produced graphical network (i.e., the two most recent graphical networks). If the differences are sufficient (e.g., exceed a threshold), output module 265 can send an alert to an analyst. For example, the differences that output module 265 can analyze can include, for example, number of subjects, similarly of subject lists, subject importance scores, connection strengths, and/or any other suitable difference. If output module 265 detects a difference that exceeds a threshold value, output module 265 can send an alert to the analyst. The alert can be a message on display 220, an email, a text message, a phone call, an audible alert from the graphical network control system 130, and/or any other suitable alert.

Figure 3:
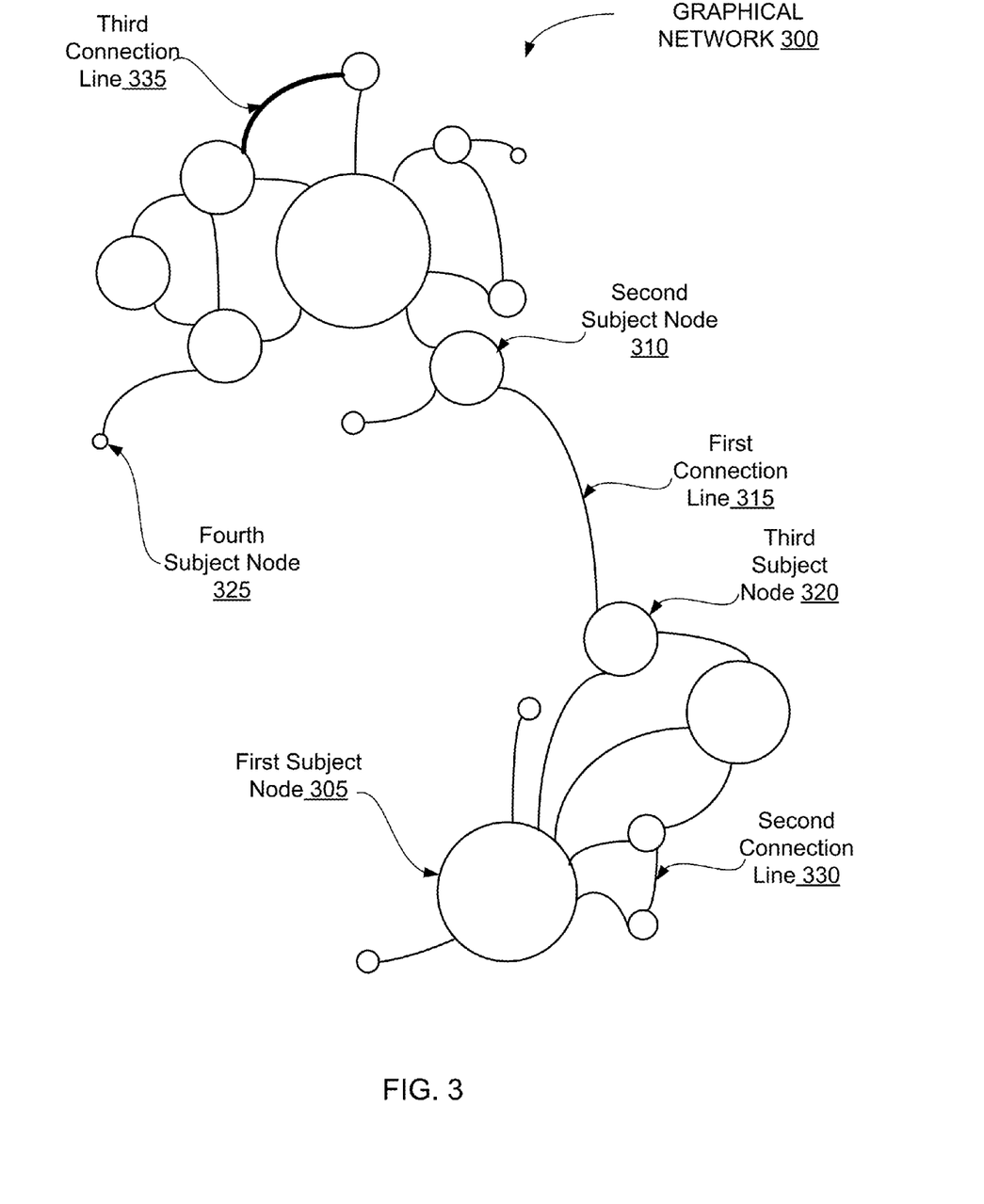
FIG. 3 illustrates a diagram of a graphical network, according to an illustrative embodiment.

FIG. 3 is a depiction of a graphical network 300, according to an embodiment. The graphical network 300 contains multiple subject nodes of various sizes 305, 310, 320, 325 and connection lines 315, 330, 335 between the subject nodes. Graphical network 300 is an example of a depiction of a graphical network and can differ for different scenarios. Each graphical network can contain any number of subject nodes and/or connections between the subject nodes. In some embodiments, the graphical networks can include 10,000 to 2 billion subject nodes, but more than 2 billion or fewer than 10,000 subject nodes can be used. Graphical network 300 is an example of a depiction of a possible output from output module 265 (FIG. 2).

Each subject node depicted in graphical network 300 can represent a subject from a subject list, for example the subject list identified by subject identification module 255. As shown in FIG. 3, the first subject node 305 is a large node. As discussed above, the size of the subject node can indicate the subject importance score. For example, a subject that is important can have a subject node that is large in comparison to other subject nodes. The first subject node 305 is much larger, for example, than the fourth subject node 325. The size difference between the first subject node 305 and the fourth subject node 325 can indicate that the first subject is more important to the analyst-selected topic analysis than the fourth subject.

The second subject node 310 is substantially equal in size to the third subject node 320. The similarity in size can indicate that the second subject node 310 can be substantially equal in importance to the third subject node 320. As shown in FIG. 3, the difference in subject node sizes can allow an analyst to quickly and easily recognize the importance of any subject depicted in the graphical network.

While the subject nodes in FIG. 3 are depicted as circular nodes, any shape, size, or color can be used to identify the subjects. In some embodiments, for example, a picture of the subject can be displayed in each subject node. In some embodiments, the shape of the subject node can indicate the importance of the subject. For example, circular subject nodes can be more important than square shaped subject nodes. In some embodiments, the analyst can select the shape, size, color, and/or any other relevant characteristic of the subject nodes that will allow the analyst to easily identify useful characteristics of the subject.

The first connection line 315 connects the second subject node 310 and the third subject node 320 in FIG. 3. As mentioned above, the length of the connection line (e.g., the first connection line 315) can indicate the strength of the connection (i.e., relationship) between the subject nodes (e.g., the second subject node 310 and the third subject node 320) connected by the connection line. For example, connection line 330 is much shorter than connection line 315. The shorter length of connection line 330 can indicate a stronger connection between the subject nodes it connects than the connection between the second subject node 310 and the third subject node 320 connected by the longer first connection line 315.

In some embodiments, the thickness of the connection line can indicate the strength of the relationship. For example, the third connection line 335 is thicker than the second connection line 330 in FIG. 3. The thicker, third connection line 335 can indicate that the subject nodes connected by the third connection line 335 have a stronger connection than the subject nodes connected by the thinner, second connection line 330.

Figure 4:
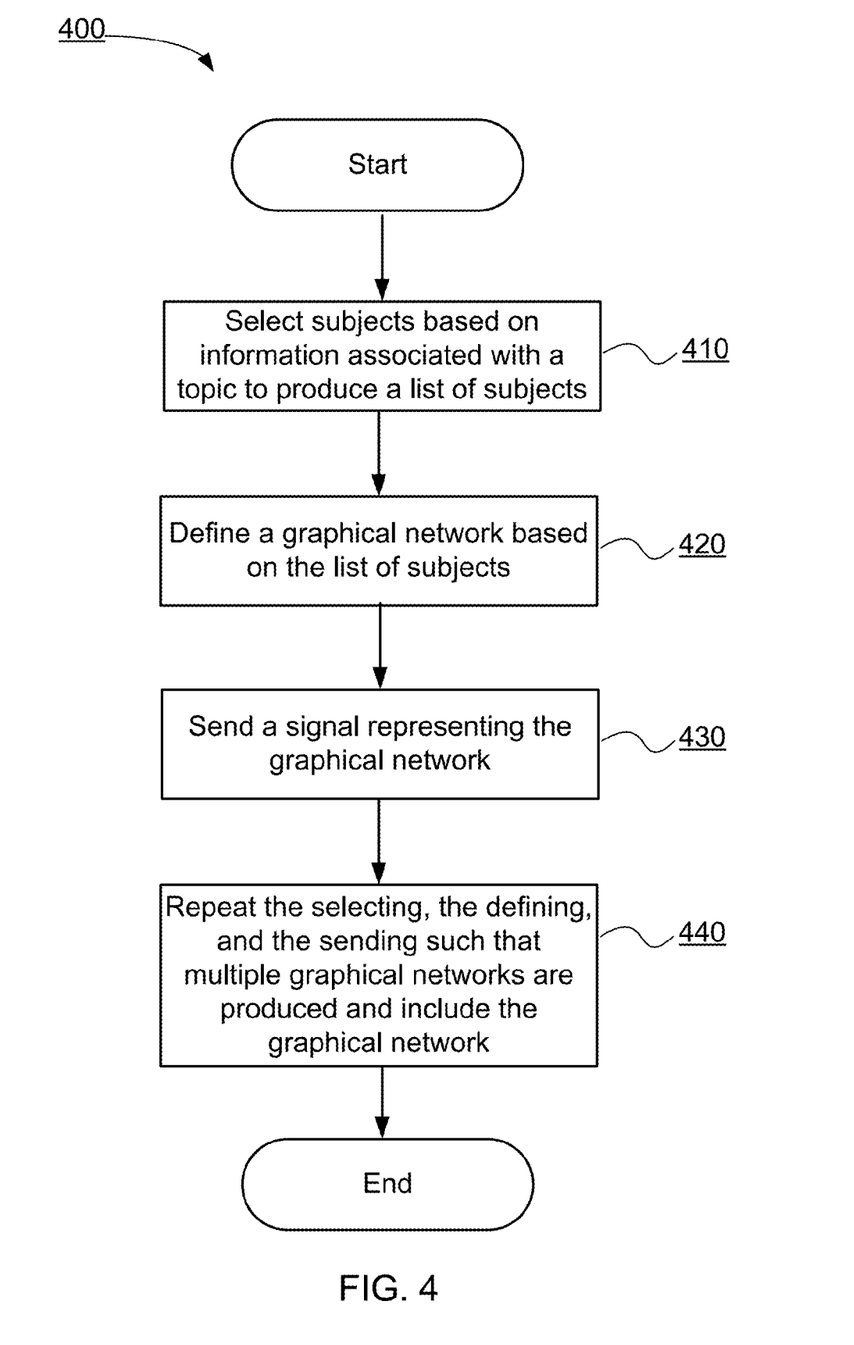
FIG. 4 illustrates a flowchart of a method for automating the definition and monitoring of a graphical network, according to an illustrative embodiment.

FIG. 4 is a flowchart of a method 400 for generating a graphical network and monitoring the graphical network, according to an embodiment. At 410, a list of subjects can be produced by selecting subjects from a data source based on information associated with a topic. For example, the analyst can select the topic using the GUI from GUI module 250. Subject identification module 255 can use that topic to analyze the data in the data source and select subjects from the data source that have an association with the topic, thereby producing a list of subjects.

At 420, a graphical network can be defined based on the list of subjects. For example, graphical network definition module 260 can define the network based on the list of subjects produced by subject identification module 255.

At 430, a signal can be sent representing the graphical network. For example, output module 265 can render an image of the graphical network based on the definition of the network produced by graphical network definition module 260 and send a signal(s) representing the image to the display 220 for the analyst to view the image.

At 440, the selecting, defining, and sending can be repeated such that multiple graphical networks are produced (e.g., consecutive graphical networks produced over time). For example, monitoring module 270 can monitor the data source for data changes. When changes are identified, monitoring module 270 can run updates to generate a recent graphical network. Similarly stated, for example, monitoring module 270 can select a list of subjects, define a graphical network based on the list of subjects, and send a signal representing the graphical network every time a change has been detected in the data. In some embodiments, the monitoring can be done periodically or repeatedly. For example, monitoring module 270 can periodically (e.g., every 30 minutes) select a list of subjects, define a graphical network based on the list of subjects, and send a signal representing the graphical network.

In some embodiments, the graphical network being monitored can result in alerts being sent to an analyst. For example, monitoring module 270 can compare the two most recent graphical networks to produce a comparison value. If the comparison value exceeds a comparison value threshold, monitoring module 270 can send an alert to the analyst as described above.

Figure 5:
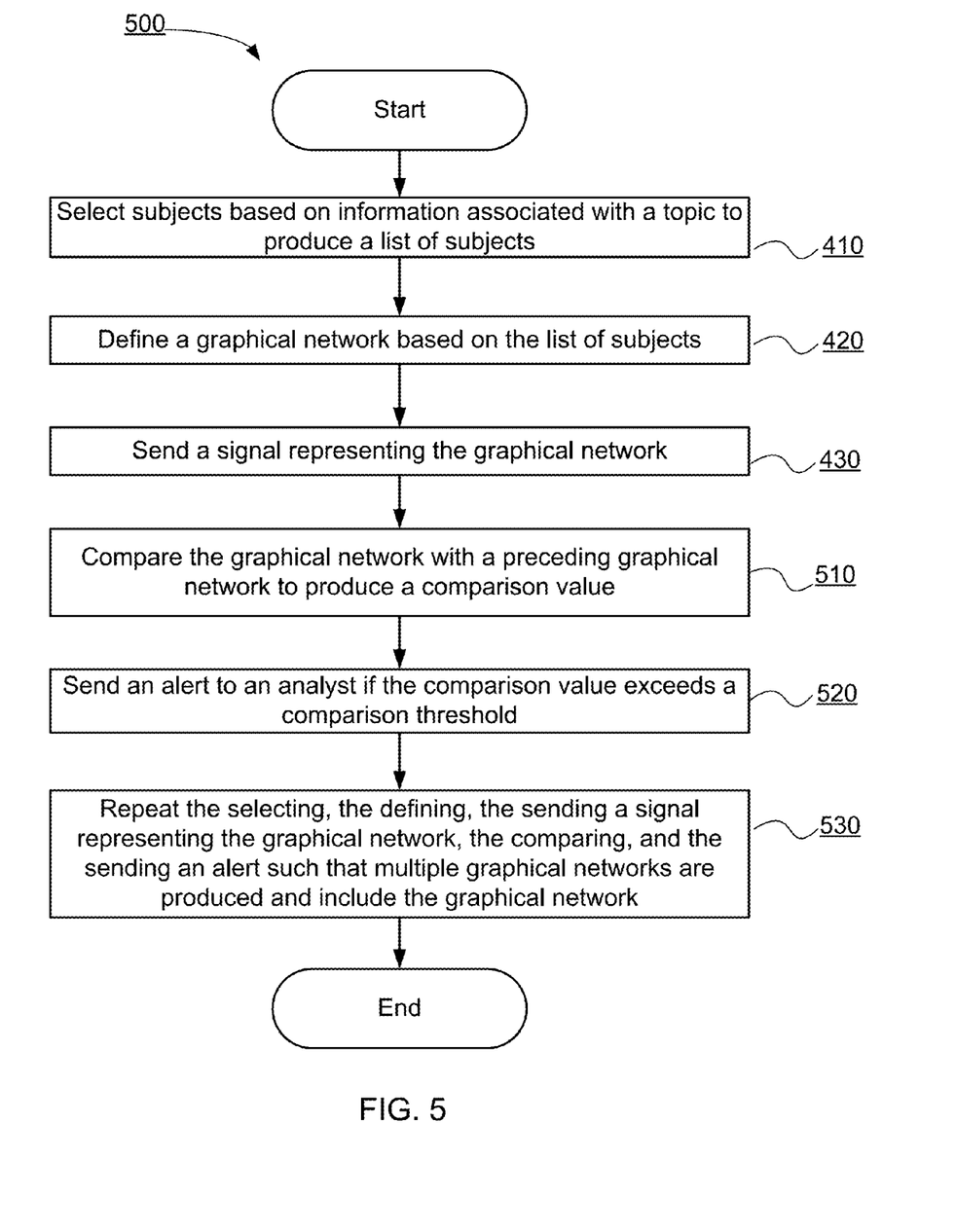
FIG. 5 illustrates a flowchart of a method for automating the definition and monitoring of a graphical network, according to another illustrative embodiment.

FIG. 5 is a flowchart of a method 500 for generating a graphical network, monitoring the graphical network, and alerting the analyst if changes to the graphical network occur, according to an embodiment. Blocks 410, 420, and 430, shown in FIG. 5, correspond to those also above with respect to FIG. 4 and are not further discussed here in reference to FIG. 5.

At 510, for each graphical network produced, a comparison value can be generated by comparing the graphical network with a preceding graphical network (a previously-generated graphical network such as the sequentially prior graphical network). For example, monitoring module 270 can produce a first graphical network at time T and a second graphical network at time T1 and compare the two graphical networks. The comparison value can be low if the two graphical networks are very similar (e.g., 99% of the same subjects appear in both graphical networks, the importance of the subjects is substantially the same in both graphical networks, and/or the strength of the connections between the subjects is substantially the same in both graphical networks). Conversely, the comparison value can be high if the second graphical network is significantly different from the first graphical network. For example, if 30% of the subjects in the first graphical network are different than the subjects in the second graphical network, the comparison value can be high, for example 80. Similarly, the comparison value can be high if the importance of one or more subjects changes. For example, if a subject had an importance score of 1 in the first graphical network that resulted in a small subject node similar in size to the fourth subject node 325 in FIG. 3 and in the second graphical network that subject's importance score raised to 3, resulting in a subject node similar in size to the second subject node 310 in FIG. 3, the comparison value can be high because the relative importance of each subject within the graphical network can be relevant to the analysis of the data. Similarly stated, an increase in a subject's importance score can result in a high comparison value, which can alert the analyst to a potentially important change in the graphical network, as described further herein.

At 520, for each graphical network produced, an alert can be sent to the analyst if the comparison value exceeds a comparison threshold. For example, if the comparison value is high, an alert can be sent indicating a change in the graphical network that may be of interest to the analyst. The alert can be sent via email, text message, a message displayed on the analyst's computer monitor (e.g., display 220), an audible alert, and/or any other suitable alert mechanism. The comparison threshold can be set as a default setting and/or by the analyst for each graphical network being monitored. For example, a low comparison value for two graphical networks that are substantially identical can be, for example, 5, and a high comparison value for two graphical networks that are substantially different can be, for example, 95. In that example, a default setting for the comparison value can be 35, such that if a comparison value is 35 or higher, an alert can be sent to the analyst. An analyst can, in some embodiments, set a comparison threshold for a graphical network being monitored. The analyst-selected comparison threshold can override the default comparison threshold, in some embodiments.

At 530, the process can be repeated starting with block 410 in FIG. 5 such that multiple graphical networks can be produced (e.g., consecutive graphical networks produced over time). For example, monitoring module 270 can monitor the data source for data changes. When changes are identified, monitoring module 270 can run updates to generate a recent graphical network. Similarly stated, for example, monitoring module 270 can, every time a change has been detected in the data, select a list of subjects, define a graphical network based on the list of subjects, send a signal representing the graphical network, compare the graphical network with a preceding graphical network, and send an alert if the comparison determines that there are changes to the graphical network that exceed a comparison threshold. In some embodiments, the monitoring can be done periodically or repeatedly. For example, monitoring module 270 can periodically (e.g., every 30 minutes) select a list of subjects, define a graphical network based on the list of subjects, send a signal representing the graphical network, compare the graphical network with a preceding graphical network, and send an alert if the comparison determines that there are changes to the graphical network that exceed a comparison threshold.

Figure 6:
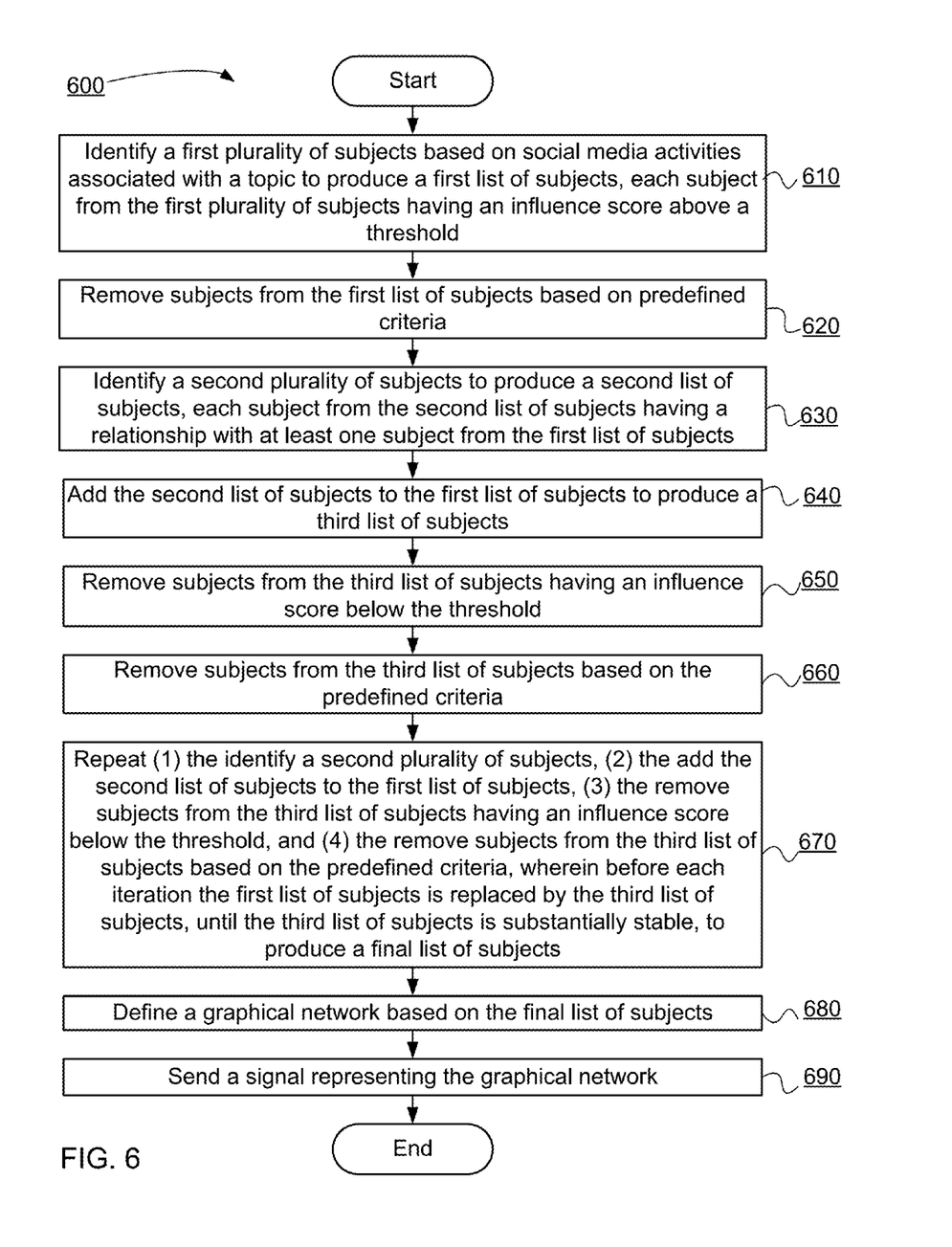
FIG. 6 illustrates a flowchart of a method for automating the definition and monitoring of a graphical network, according to yet another illustrative embodiment.

FIG. 6 is a flowchart of a method 600 for generating a graphical network, according to an embodiment. At 610, multiple subjects are identified based on social media activities associated with a topic to produce a first list of subjects, each subject having an influence score above a threshold. For example, the subject identification module 255 (FIG. 2) can identify subjects related to a topic and score the subjects based on, for example, the number of communications associated with the topic and/or the closeness of the communications to the topic. For example, a subject with 100 communications on the topic can have a higher influence score than a subject with 5 communications on the topic. For another example, a subject with 5 communications that are closely related to the topic (e.g., the topic is the Denver Broncos and the subject has 5 communications on the Denver Broncos, including a play-by-play analysis of the last game) can have a higher influence score than a subject with 20 communications that are only moderately related to the topic (e.g., the topic is the Denver Broncos and the subject has 20 communications that mention the Denver Broncos in passing while talking in detail about the Detroit Lions). An influence score for the subjects in the first subject list can be calculated using scoring algorithms based on, for example, Closeness Centrality, Betweenness Centrality, and/or any other suitable network scoring algorithm can be used. In some embodiments, a score threshold can be determined by an analyst and/or can be a default value.

At 620, subjects are removed from the first list of subjects based on predefined criteria. For example, a filter can be used to remove subjects from the list that show up but are not likely to be useful to the analysis or can skew the results. For example, a subject that is a sports journalist can likely appear in the subject list when the topic is the Denver Broncos. A sports journalist, however, is not helpful, and can potentially skew the analysis, if one is looking for the biggest fans of the Denver Broncos. A filter, therefore, can be implemented that can remove, for example, known sports journalists from the subject list. The filter can be any filter that helps the analysis from the perspective of the analyst. For another example, the connection strength can have a threshold below which the subject can be removed from the subject list. Similarly stated, a first subject node connected only to one other subject node through a weak connection can have a low connection strength value. In that example, the first subject node can be removed from the first list of subjects if the connection strength value is below the connection strength value threshold. In addition to filters and connection strength threshold values, any other criteria can be used to remove subjects from the first list of subjects.

At 630, a second set of subjects can be identified to produce a second list of subjects, each subject having a relationship with at least one subject from the first list of subjects. For example, subject identification module 255 can identify subjects that have a relationship with subjects from the first list of subjects. The relationship between two subjects can be, for example, self-identified, an assertion, and/or any other suitable relationship that can be identified.

At 640, the first list of subjects can be added to the second list of subjects to produce a third list of subjects.

At 650, subjects having an influence score below the threshold can be removed from the third list of subjects. For example, subject identification module 255 can score the subjects as described above. Subjects that have an influence score below the threshold can be removed from the third list of subjects.

At 660, subjects can be removed from the third list of subjects based on the predefined criteria. As described above, a filter can be used to remove subjects that are not useful to the analysis or that skew the results. Also described above, a connection strength threshold value can be criteria that can be used to remove subjects from the third list of subjects.

At 670, the first list of subjects can be replaced with the third list of subjects, and the identifying a second plurality of subjects, the adding the second list of subjects to the first list of subjects, the removing subjects from the third list of subjects having an influence score below the threshold, and the removing subjects from the third list of subjects based on the predefined criteria can be repeated until the third list of subjects is substantially stable to produce a final list of subjects. For example, the subject identification module 255 can iterate identifying subjects based on a relationship with subjects from the prior iteration. The subject identification module 255 can add the lists together and score the entire list of subjects to determine which have influence scores above the threshold. The subject identification module 255 can remove subjects that have an influence score below the threshold. The subject identification module 255 can also remove subjects based on predefined criteria as described above. Each iteration produces a new list of subjects that can have fewer and fewer differences between iterations. Once the list of subjects reaches substantial stability (e.g., less than 3% change in the list from one iteration to the next) the subject identification module 255 can generate a final list of subjects.

At 680, a graphical network can be defined based on the final list of subjects. For example, graphical network definition module 260 can define the graphical network based on the final list of subjects from subject identification module 255. The graphical network definition can include subject importance scores, connection strength values, and/or any other information that can be useful in analyzing the graphical network.

At 690, a signal can be sent representing the graphical network. For example, the output module 265 can send a visual depiction of the graphical network to display 220 for the analyst to view.

It is intended that some of the methods and apparatus described herein can be performed by software (stored in memory and executed on hardware), hardware, or a combination thereof. For example, the subject identification module can be performed by such software and/or hardware. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, C#, Java™, Ruby, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

While various embodiments have been described above, it should be understood that they have been presented by way of example only, and not limitation. Where methods and steps described above indicate certain events occurring in certain order, the ordering of certain steps may be modified. Additionally, certain steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein.

What is claimed is:

1. A non-transitory processor-readable medium storing code representing instructions to be executed by a processor, the code comprising code to cause the processor to:
   identify a plurality of users based on information associated with an analyst-selected topic to produce a first list of users;
   expand the first list of users to include users that have a relationship with at least one user from the first list of users to produce a second list of users;
   remove users from the second list of users based on at least one of a filter or a scoring threshold to produce a third list of users;
   iterate the code to expand the first list of users and the code to remove users from the second list of users, before each iteration the first list of users being replaced by the third list of users, until a difference between the third list of users and the first list of users falls below a predetermined threshold of users to produce a final list of users;
   generate a graphical network representing the final list of users; and
   send a signal representing the graphical network.

2. The non-transitory processor readable medium of claim 1,
   wherein the information includes a plurality of social media contributions.

3. The non-transitory processor readable medium of claim 1,
   wherein the code to remove users includes code to cause the processor to remove each user from the second list of users that has a volume of relationship data above a relationship volume threshold.

4. The non-transitory processor readable medium of claim 1,
   wherein the relationship includes at least one reply to at least one contribution from a plurality of contributions.

5. The non-transitory processor readable medium of claim 1,
   wherein the relationship includes a self-identified relationship.

6. The non-transitory processor readable medium of claim 1,
   wherein the graphical network is a first graphical network generated at a first time, further comprising code to cause the processor to:
   repeat the code to identify, the code to expand, the code to remove, the code to iterate, and the code to generate to produce a second graphical network at a second time after the first time; and
   send a signal representing the second graphical network.

7. The non-transitory processor readable medium of claim 1,
   wherein the graphical network is a first graphical network generated at a first time, further comprising code to cause the processor to:
   repeat the code to identify, the code to expand, the code to remove, the code to iterate, and the code to generate to produce a second graphical network at a second time after the first time;
   send a signal representing the second graphical network;
   analyze differences between the first graphical network and the second graphical network; and
   send an alert to an analyst based on the differences.

8. The non-transitory processor readable medium of claim 1,
   further comprising code to cause the processor to:
   periodically repeat the code to identify, the code to expand, the code to remove, the code to iterate, and the code to generate to produce a plurality of graphical networks; and
   send, upon the generation of each graphical network from the plurality of graphical networks, a signal representing that graphical network.

9. The non-transitory processor readable medium of claim 1,
   wherein the graphical network is a first graphical network generated at a first time, further comprising code to cause the processor to:
   receive notification of at least one update to the analyst-selected topic after the first time;
   repeat the code to identify, the code to expand, the code to remove, the code to iterate, and the code to generate to produce a second graphical network at a second time after receiving the notification; and
   send a signal representing the second graphical network.

10. A computer implemented method comprising:
   identifying, with one or more processors of a computer, a first plurality of users based on social media activities associated with a topic to produce a first list of users, each user from the first plurality of users having an influence score above a threshold;
   removing, with the one or more processors, users from the first list of users based on predefined criteria;
   identifying, with the one or more processors, a second plurality of users to produce a second list of users, each user from the second list of users having a relationship with at least one user from the first list of users;

adding, with the one or more processors, the second list of users to the first list of users to produce a third list of users;

removing, with the one or more processors, users from the third list of users having an influence score below the threshold;

removing, with the one or more processors, users from the third list of users based on the predefined criteria;

repeating (1) the identifying a second plurality of users, (2) the adding, (3) the removing users from the third list of users having an influence score below a threshold, and (4) the removing users from the third list of users based on the predefined criteria, wherein before each iteration the first list of users is replaced by the third list of users, until the difference between the third list of users and the first list of users falls below a predetermined percentage change in users, to produce a final list of users;

generating, with the one or more processors, a graphical network representing the final list of users; and sending a signal representing the graphical network.

11. The method of claim 10, wherein the relationship is based on at least one of:

a first social media relationship defined by the social media provider; or a second social media relationship created by the user from the first list of users having the relationship.

12. The method of claim 10, further comprising:

repeating (1) the identifying the first plurality of users, (2) the removing users from the first list of users, (3) the identifying the second plurality of users, (4) the adding, (5) the removing users from the third list of users having an influence score below a threshold, (6) the removing users from the third list of users based on the predefined criteria, (7) the repeating, (8) the defining, and (9) the sending, periodically.

13. The method of claim 10, further comprising:

repeating (1) the identifying the first plurality of users, (2) the removing users from the first list of users, (3) the identifying the second plurality of users, (4) the adding, (5) the removing users from the third list of users having an influence score below a threshold, (6) the removing users from the third list of users based on the predefined criteria, (7) the repeating, (8) the defining, and (9) the sending, based on at least one change in the social media activities associated with the topic.

14. The non-transitory processor-readable medium of claim 1, wherein the predetermined threshold is twenty-five percent.

* * * * *